US005942562A

United States Patent [19]
Billings

[11] Patent Number: 5,942,562
[45] Date of Patent: Aug. 24, 1999

[54] HIGH TEMPERATURE THERMAL INSULATING MATERIAL

[75] Inventor: Patricia J. Billings, Leawood, Kans.

[73] Assignee: Earth Products Limited, Leawood, Kans.

[21] Appl. No.: 09/039,069

[22] Filed: Mar. 13, 1998

[51] Int. Cl.$^6$ ...................................................... C08K 9/02
[52] U.S. Cl. ................. 523/204; 523/200; 523/201; 524/2; 524/423; 524/425
[58] Field of Search ................................. 523/200, 201, 523/204; 524/2, 423, 425

[56] References Cited

U.S. PATENT DOCUMENTS

| | | |
|---|---|---|
| 3,741,926 | 6/1973 | Jurecic . |
| 3,869,415 | 3/1975 | Williams . |
| 3,917,771 | 11/1975 | Basile . |
| 3,947,398 | 3/1976 | Williams . |
| 4,057,528 | 11/1977 | Hunt . |
| 4,125,504 | 11/1978 | Mani et al. . |
| 4,151,150 | 4/1979 | Peters et al. . |
| 4,202,809 | 5/1980 | Eash . |
| 4,225,496 | 9/1980 | Columbus et al. . |
| 4,253,288 | 3/1981 | Chun . |
| 4,304,704 | 12/1981 | Billings ...................... 260/29.65 |
| 4,430,463 | 2/1984 | Mullenax . |
| 4,578,915 | 4/1986 | Schneller . |
| 4,649,166 | 3/1987 | De Fatis . |
| 4,704,415 | 11/1987 | Pierce et al. . |
| 4,734,337 | 3/1988 | Patton . |
| 4,758,612 | 7/1988 | Wilson et al. . |
| 4,792,360 | 12/1988 | Pierce et al. . |
| 4,804,688 | 2/1989 | Vassileff . |
| 4,849,018 | 7/1989 | Babcock et al. . |
| 5,075,358 | 12/1991 | Riley et al. . |
| 5,108,679 | 4/1992 | Rirsch et al. . |
| 5,122,554 | 6/1992 | Allen . |
| 5,185,389 | 2/1993 | Victor . |
| 5,210,989 | 5/1993 | Jakel . |
| 5,242,708 | 9/1993 | Fekete et al. . |
| 5,276,074 | 1/1994 | Allen . |
| 5,279,867 | 1/1994 | Friedt et al. ...................... 427/583 |
| 5,288,775 | 2/1994 | Bischoff et al. . |
| 5,290,355 | 3/1994 | Jakel . |
| 5,332,435 | 7/1994 | Wright et al. . |
| 5,352,290 | 10/1994 | Takeshita et al. . |
| 5,384,355 | 1/1995 | Allen . |
| 5,391,245 | 2/1995 | Turner . |
| 5,393,343 | 2/1995 | Darwin et al. . |
| 5,395,442 | 3/1995 | Dunton et al. . |
| 5,498,683 | 3/1996 | Kim . |
| 5,603,758 | 2/1997 | Schreifels, Jr. . |
| 5,685,903 | 11/1997 | Stav et al. . |

FOREIGN PATENT DOCUMENTS

| | | |
|---|---|---|
| 197808 | 8/1978 | Japan . |
| 190884 | 11/1983 | Japan . |
| 171260 | 9/1985 | Japan . |

OTHER PUBLICATIONS

WPIDS Abstract No. 97–411151 which is an abstract of Japanese Patent Specification No. 184247 (Jul. 1997).
WPIDS Abstract No. 85–022159 which is an abstract of Japanese Patent Specification No. 59–217687 (Dec. 1984).
WPIDS Abstract No. 93–012052 which is an abstract of Japanese Patent Specification No. 04–338181 (Nov. 1992).
WPIDS Abstract No. 97–369254 which is an abstract of Japanese Patent Specification No. 09–156993 (Jun. 1997).
PCT No. WO 91/03438 abstract (Mar. 1991).
WPIDS Abstract No. 83–714613 which is an abstract of Japanese Patent Specification No. 58–099159 (Jun. 1983).
WPIDS Abstract No. 84–044631 which is an abstract of Great Britain Patent Specification No. 2,124,672 (Feb. 1984).

*Primary Examiner*—James J. Seidleck
*Assistant Examiner*—U. K. Rajguru
*Attorney, Agent, or Firm*—Shook, Hardy & Bacon LLP

[57] ABSTRACT

A high temperature thermal insulation has a dry mixture which includes cement, gypsum and a special particulate material having small particles which exhibit good insulating properties. The particles have a low density polymeric core covered by a chemically inert coating such as calcium carbonate. A special liquid catalyst is added to the dry mixture to cause the particles to be bound together with the cement and gypsum. The cement and gypsum cover and protect the particles from melting due to elevated temperatures, and the particles are thus able to resist heat transfer in high temperature applications.

12 Claims, No Drawings

HIGH TEMPERATURE THERMAL INSULATING MATERIAL

FIELD OF THE INVENTION

This invention relates generally to thermal insulation and deals more particularly with an insulating material which retains its insulating properties at elevated temperatures, and with a method of preparing a high temperature insulating material.

BACKGROUND OF THE INVENTION

Conventional thermal insulation is characterized by a notable deterioration in its ability to resist heat transfer as the temperature increases. Consequently, the insulating properties ("R factor") are significantly reduced at relatively high mean temperatures. Another problem with many types of insulation is that the density is high and the material is too heavy to be practical for use in many applications. Conventional insulating materials are also subject to degradation when exposed to moisture. There are also limitations as to the ways in which the insulating materials can be applied. For example, conventional materials are not flexible enough to allow their application by spraying, pumping, pouring, or molding, and this further limits the applications in which they can be used.

Although various types of lightweight polymers have been available in recent years, they have for the most part not been useful to construct thermal insulating materials, particularly materials that are used at higher temperatures. The problem is that these polymers tend to have a relatively low melting temperature and can melt if the temperature increases beyond their melting temperature. Thus, while their low density and good insulating properties make many modern materials acceptable in low temperature applications, the fact that they melt at low temperatures renders them useless as high temperature insulation which is exposed to temperatures in excess of about 180° F.

SUMMARY OF THE INVENTION

In accordance with the present invention, a thermal insulating material is provided in a formulation which retains effective insulating properties at high temperatures. In addition, the material is light in weight, easily applied, fire resistant, able to function effectively over a prolonged useful life, and able to withstand exposure to moisture without deteriorating.

The present invention takes full advantage of a low density particulate material that has good insulating characteristics, even though the melting temperature of the particulate material is only about 180° F. In accordance with the invention, the particles are bound up in cement and gypsum which protects the particles from melting. A special styrene acrylic catalyst is used to chemically react with the other materials in a manner to hold the gypsum, cement and particulate material together. The particles provide effective insulation and high mean temperatures because of the protection provided by the gypsum and cement composition, while the overall weight of the material is maintained low due to the presence of a large volume of particulate material compared to the gypsum and cement.

Preferably, the particulate material takes the form of a low density polymeric core which is covered by a chemically inert coating. The core may be acrylonitrile copolymer and the coating may be calcium carbonate. The particle size is about 95 microns in the preferred embodiment. The cement and gypsum are present in approximately equal amounts, while the particulate material is present in an amount equal to about 18 times the cement content by volume. Thus, the lightweight particles take up the vast majority of the volume of the end product, resulting in a light overall weight while taking advantage of the insulating properties of the particulate material.

The catalyst is a liquid which is principally styrene acrylic and is mixed with the dry mixture in the amount of about four liquid ounces of catalyst per pound of cement. When the constituents are all mixed together, the resulting product is in a free flowing fluid form that can be sprayed, pumped, poured or otherwise easily applied as desired for the particular application that is involved. For example, the product may be sprayed onto a wall or other surface through a small orifice paint gun or grout gun. Prefabricated walls or panels can be produced by applying the material into a mold and allowing it to set up and harden. The material can be poured, pumped or sprayed into cavities such as hollow interior regions in an airplane, boat, military vehicle, vault, storage area, or areas around pipes or conduits.

DETAILED DESCRIPTION OF THE INVENTION

The present invention is directed to a thermal insulating material which finds its principal use in relatively high temperature environments in which the temperature exceeds about 180° F. In accordance with a preferred embodiment of the invention, a dry mixture is prepared by mixing together gypsum, portland cement, and special particulate material which exhibits excellent resistance to heat transfer and which has other desirable properties such as a low density and a small particle size which facilitates application with a paint application gun or a grout application gun.

The gypsum which is used in the insulating material may be a high density gypsum composition which is available from U.S. Gypsum Company under the trademark HYDRO-STONE. The cement may be a type II portland cement, although other types of cement can be used. The cement and gypsum are present in approximately equal amounts by volume in the dry mixture.

The particulate material which exhibits good insulating properties is present in a considerably greater amount by volume than the gypsum and cement. Preferably, the particulate material is present in an amount that is equal to approximately 18 times the amount of cement by volume.

The particulate material preferably includes small particles which have a size of approximately 95 microns, although the particle size can vary somewhat. The particles in the particulate material include a low density polymeric core which may be acrylonitrile copolymer. The core is enclosed or covered by a chemically inert coating which may be calcium carbonate. The coating is used to protect the core material from attack by chemicals, moisture and other substances.

The high temperature insulating material includes a liquid catalyst which is added to the dry mixture and which creates a chemical reaction that binds together the gypsum, cement and the particulate material. The catalyst is a styrene acrylic catalyst. An acceptable product is commercially available from Geobond International, Inc. as "Geobond Catalyst H6". The catalyst is added to the dry mixture in the amount of approximately four liquid ounces of catalyst per pound of cement in the dry mixture.

The high temperature insulating material is prepared by mixing together the dry ingredients in the proportions indicated. The catalyst is then added in the proper amount, and the resulting product is initially in a free flowing fluid form which can be sprayed, poured, or pumped, depending upon the application. For example, the material can be sprayed in a fluid form onto a wall or panel through the use of a small orifice paint gun or grout gun. The small size of the particles in the particulate material allows application with a small orifice applicator gun which facilitates application and allows a more uniform coating when spraying techniques are used.

Alternatively, the material can be pumped or poured into a mold having the desired shape of the end product. For example, the material can be cast in the form of a wall section or a panel. After the material has been allowed to set long enough for the liquid portion to evaporate, the gypsum, cement, and particulate material are bound together to provide a rigid structure having the shape of the mold. In this fashion, rigid wall panels or other building panels can be fabricated.

The material can also be sprayed, pumped or poured in fluid form into internal cavities such as hollow spaces formed within parts of aircrafts, boats, or other vehicles, as well as around vaults, storage areas or pipes that carry liquids or gases.

The particulate material normally has a melting temperature of approximately 180° F., and this obviously makes its use in a high temperature application in excess of 180° F. questionable. However, in accordance with the present invention, the particulate material is bound up in the cement and gypsum which surrounds the particles and protects them from heat and also gives the product good fire resistance characteristics. By way of example, it has been determined that a product constructed in accordance with the present invention will not ignite even when exposed to temperatures up to 2000° F.

Thus, the good insulating properties of the particulate material are taken full advantage of, while it is protected against degradation from heat, water, chemicals, and other materials by the cement and gypsum included in the insulating material. At the same time, the low density of the particulate material provides a lightweight overall product because the particulate material occupies the vast majority of the volume of the material. The material is also able to function over a long useful life and does not deteriorate with time due to its structural properties and its ability to resist chemical degradation. The material does not dissolve in water and is able to withstand moisture without losing its desirable characteristics.

It has been found that the insulating effectiveness of the material (R factor) does not deteriorate significantly with increased temperatures. For example, the R factor at 60° F. is approximately three for each inch of thickness of material. Increasing the temperature to 98° F. results in an R factor that is reduced only to approximately 2.35 per inch of thickness of the material.

Thus, it is evident that the material of the present invention exhibits effective resistance to heat transfer at relatively high temperatures, while exhibiting other beneficial properties in the areas of structural capabilities, lightweight, easy application, a long life, and the ability to resist moisture and chemical attack.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, I claim:

1. A composition for use as a high temperature thermal insulating material, comprising:
    cement and gypsum present in approximately equal amounts by volume;
    a particulate material present in an amount equal to approximately eighteen times the amount of cement by volume, said particulate material comprising a low density polymeric core covered by a chemically inert coating; and
    a liquid catalyst which includes styrene acrylic, said catalyst being present in an amount equal to approximately four liquid ounces per pound of cement.

2. A composition as set forth in claim 1, wherein said particulate material comprises particles having a size of approximately 95 microns.

3. A composition as set forth in claim 2, wherein said core comprises acrylonitrile copolymer.

4. A composition as set forth in claim 3, wherein said coating comprises calcium carbonate.

5. A composition as set forth in claim 1, wherein said core comprises acrylonitrile copolymer.

6. A composition as set forth in claim 5, wherein said coating comprises calcium carbonate.

7. A method of preparing a high temperature thermal insulating material, comprising the steps of:
    mixing together cement, gypsum and a particulate material in amounts by volume of approximately 1 part cement, 1 part gypsum and 18 parts particulate material to obtain a dry mixture, with the particulate material comprising particles each having a low density polymeric core covered by a chemically inert coating; and
    adding to said dry mixture a liquid catalyst which includes styrene acrylic, said catalyst being added in an amount equal to approximately four liquid ounces per pound of cement.

8. A method as set forth in claim 7, wherein said core comprises acrylonitrile copolymer and said coating comprises calcium carbonate.

9. A method of constructing a high temperature thermal insulating material, comprising the steps of:
    mixing together cement, gypsum and a particulate material in relative amounts by volume of approximately 1 part cement, 1 part gypsum and 18 parts particulate material to prepare a dry mixture, said particulate material comprising particles each having a low density polymeric core covered by a chemically inert coating;
    adding to said dry mixture a liquid catalyst which includes styrene acrylic, said catalyst being added in an amount equal to approximately four liquid ounces per pound of cement; and
    applying the resulting product in fluid form.

10. A method as set forth in claim 9, wherein said applying step comprises applying said resulting product into a mold having a preselected shape.

11. A method as set forth in claim 9, wherein said applying step comprises spraying said resulting product onto a selected surface to be insulated.

12. A method as set forth in claim 9, wherein said applying step comprises adding said resulting product into a cavity in a selected part.

* * * * *